(12) United States Patent
Hauck et al.

(10) Patent No.: US 9,140,320 B2
(45) Date of Patent: Sep. 22, 2015

(54) DEVICE FOR BRAKING AND/OR BLOCKING A SHAFT OF A VEHICLE TRANSMISSION AND METHOD FOR MANUFACTURING SUCH A DEVICE

(75) Inventors: Helmut Hauck, Euerbach (DE); Patrice Ribault, Vouvray (FR); Sylvain Bussit, Monnaie (FR)

(73) Assignee: AKTIEBOLAGET SKF, Gothenburg (SE)

( * ) Notice: Subject to any disclaimer, the term of this patent is extended or adjusted under 35 U.S.C. 154(b) by 189 days.

(21) Appl. No.: 13/581,909

(22) PCT Filed: Mar. 2, 2011

(86) PCT No.: PCT/EP2011/053092
§ 371 (c)(1),
(2), (4) Date: Nov. 12, 2012

(87) PCT Pub. No.: WO2011/113695
PCT Pub. Date: Sep. 22, 2011

(65) Prior Publication Data
US 2013/0299303 A1 Nov. 14, 2013

(30) Foreign Application Priority Data
Mar. 15, 2010 (DE) .......................... 10 2010 011 520

(51) Int. Cl.
*F16D 49/10* (2006.01)
*F16D 49/02* (2006.01)
(Continued)

(52) U.S. Cl.
CPC . *F16D 49/02* (2013.01); *B60T 1/06* (2013.01); *B60T 1/062* (2013.01); *F16D 49/10* (2013.01); *F16D 65/067* (2013.01);
(Continued)

(58) Field of Classification Search
CPC .... F16D 49/10; F16D 65/067; F16H 63/3003
USPC .............. 188/77 R, 77 W, DIG. 2; 192/223.4, 192/219.2
See application file for complete search history.

(56) References Cited

U.S. PATENT DOCUMENTS 1,877,976 A * 9/1932 Rosenfeld et al. ......... 192/219.2
2,073,408 A * 3/1937 Litchfield ....................... 188/30
(Continued)

FOREIGN PATENT DOCUMENTS

CN 101025211 A 8/2007
CN 101381232 A 3/2009
(Continued)

*Primary Examiner* — Thomas Irvin
(74) *Attorney, Agent, or Firm* — Bryan Peckjian; SKF USA Inc. Patent Dept.

(57) ABSTRACT

A vehicle transmission includes a housing part, a shaft extending from the housing part, and a spring element having a plurality of spring windings wound around the shaft, a first end of the spring element being fixed to the housing part. An actuating means is attached to a second end of the spring element and is configured to twist the second end in a circumferential direction of the spring element to thereby cause the spring element to tighten and frictionally contact an outer circumference of the shaft. The spring element is comprised of a hollow cylindrical metal base body having a helical-shaped incision that defines the plurality of spring windings. The incision may be formed in the hollow cylindrical base body by a plasma beam process, by a laser cutting process, by a flame cutting process or by a water jet cutting process.

11 Claims, 3 Drawing Sheets

(51) Int. Cl.
  *B60T 1/06* (2006.01)
  *F16D 65/06* (2006.01)
  *F16H 63/30* (2006.01)

(52) U.S. Cl.
  CPC .... *F16D 2250/00* (2013.01); *F16D 2250/0092* (2013.01); *F16H 63/3003* (2013.01); *Y10T 29/49611* (2015.01)

(56) References Cited

U.S. PATENT DOCUMENTS

| | | | | |
|---|---|---|---|---|
| 3,405,791 A | * | 10/1968 | Kaplan | 192/81 R |
| 3,897,857 A | * | 8/1975 | Rodaway | 188/2 F |
| 4,985,613 A | * | 1/1991 | Lytra et al. | 235/101 |
| 5,037,231 A | * | 8/1991 | Kitamura | 403/120 |
| 5,062,619 A | | 11/1991 | Sato | |
| 5,671,912 A | * | 9/1997 | Langford et al. | 254/267 |
| 2003/0146057 A1 | | 8/2003 | Fujii et al. | |
| 2010/0038203 A1 | | 2/2010 | Wheals | |

FOREIGN PATENT DOCUMENTS

| | | |
|---|---|---|
| CN | 101573263 A | 11/2009 |
| FR | 2901165 A1 | 11/2007 |
| WO | WO2008044058 A1 | 4/2008 |

* cited by examiner

US 9,140,320 B2

DEVICE FOR BRAKING AND/OR BLOCKING A SHAFT OF A VEHICLE TRANSMISSION AND METHOD FOR MANUFACTURING SUCH A DEVICE

CROSS-REFERENCE

This application is the U.S. National Stage of International Application No. PCT/EP2011/053092 filed on Mar. 2, 2011, which claims priority to German patent application no. 10 2010 011 520.7 filed on Mar. 15, 2010.

TECHNICAL FIELD

The invention relates to a device for braking and/or blocking a shaft, wherein the device comprises a spring element, which winds around a portion of the outer circumference of the shaft by a number of spring windings, wherein one end of the spring element is fixed to a housing part and wherein an actuating means is present, with which the other end of the spring element can be twisted in the circumferential direction, so that the spring element can be tightened by the actuating element, so that it can frictionally contact the portion of the outer circumference of the shaft. Further, the invention relates to a method for manufacturing such a device.

RELATED ART

A device of the above-mentioned type is known from WO 2008/044058 AI. Such device, also called a "hill-hold" system, is utilized in various applications. An important field is that of the vehicle industry.

Hill-hold systems have the object to make uphill driving on a hill easier for the driver of the vehicle. This is useful, in particular, in vehicles having automatic or automated transmissions, since the driver does not have the possibility in this case of building up the necessary torque by a "slipping" of the clutch, which prevents the rolling-back of the vehicle. This is the reason why, e.g., vehicles having torque converter automatic transmissions start a forward movement without pressing the accelerator pedal as soon as the brake is released.

In double clutch systems, which are generally automated and thus also belong to this group, the "slipping" of the clutch is possible using the electronic control, but leads to disadvantages with respect to the holding force, heat generation, wear, etc.

Hill-hold systems assist the above-mentioned holding force function of the transmission. In addition to various solutions, those are especially wide spread that are based upon the principle of a band brake; this is also the case in the above-mentioned WO 2008/044058 AI. There the band principle is realized using a spring, which reduces its diameter at its end by torsion and thus builds up a frictional connection to the shaft there, which frictional connection then brakes this shaft and/or hinders (blocks) the rotation.

It has been recognized as disadvantageous in the above-mentioned known solution that the manufacture of the spring is relatively expensive for the specific application, since classic manufacturing methods have been used for such a spring. For series-manufacture, this method is too cost-intensive.

SUMMARY

It is an object of the present teachings to disclose a device and a method, with which it is possible to manufacture such a coil spring in a cost-effective manner and thus specialized for usage in series-manufacturing. Further, the coil spring is preferably especially well suited for application in a vehicle power train.

In one aspect of the present teachings, the spring element is produced from an at least cross-sectionally hollow-cylindrical metal base body, into which a helical-shaped-extending incision has been introduced to form individual spring windings, which incision extends over a predetermined axial extension of the base body.

The hollow-cylindrical base body of the spring element is preferably provided with a flange-like affixing element at least in one of its axial end portions.

According to one preferred aspect of the present teachings, the affixing element can be formed from the same material as the base body of the spring element, i.e. it can be integrally formed with the base body without any seam therebetween.

In the alternative, however, it is also possible that the affixing element is made as a separate component and is fixed to the base body of the spring element. The affixing element and the base body of the spring element are preferably connected with each other by a friction-fit, an interference-fit or a materially-bonded connection.

The flange-like affixing element can have a radially-outward-extending segment only at one circumferential location, on which segment the actuating means can directly or indirectly engage, wherefore preferably at least one through-bore is disposed in the segment.

However, it is also possible that the flange-like affixing element has a circular-ring shape, wherein a number of affixing bores is disposed in the affixing element.

The spring element preferably has at least 3, more preferably at least 5, complete spring windings. A sufficient encircling of the shaft is provided thereby and as well a satisfactory braking effect.

The spring element can be provided with a wear protection at least on its radially-inward-lying surface.

The spring windings can have linear segments in the axial direction at least on their radially-inward-lying surface, i.e. they can have an inner cylindrical surface here.

The spring windings can also have—especially in the axial direction—a not constant width.

Also, the spacings between the individual spring windings can be formed—especially in the axial direction—not constant.

The device is preferably a component of a vehicle transmission, wherein the housing part is the housing of the vehicle transmission. The housing part could, however, also be the housing of a separate component on and/or in the transmission.

According to another aspect of the present teachings, a method for manufacturing a device for braking and/or blocking a shaft of the above-mentioned type may preferably include:

a) providing an at least cross-sectionally hollow-cylindrical metal base body;

b) introducing a helical-shaped-extending incision into the base body over a predetermined axial extension of the base body.

The introducing of the incision can take place by a plasma beam process, by a laser cutting process, by a flame cutting process or by a water jet cutting process.

In the alternative, the introducing of the incision can also take place by a mechanical cutting process, in particular by a milling process and/or by a lathing process.

The base body can be manufactured by a plastic deformation process and/or a stamping process. Before the above step b), the base body can be subjected to a heat treatment.

At least the radial-inward-lying surface of the spring element and/or the spring windings can be provided with a coating, which preferably takes place after the above step b).

The invention also provides, according to a preferred design, to manufacture the spring element from a metal plate primarily by plastic deformation processes and then to generate the spring windings by using a cutting process. Thus, the spring element is manufactured in this case by plastic deformation from a starting material.

Another advantageous design provides a composite made of a pipe (for the spring element) and axially-adjacent metal plate parts, from which the spring element is composed as a whole.

The proposed method represents a cost-effective possibility to prepare the spring element and thus an alternative to known methods. It is thus advantageous that the integration of additional functions (e.g., fixing, blocking function and activating) is also possible without a large additional expense.

It is also very advantageous that the spring element has, for manufacturing reasons, a substantially cylindrical surface on its radial-inward-lying side, so that the friction contact surface with the to-be-braked and/or to-be-blocked shaft is relatively large and in particular, much larger than when classic springs are utilized with circular-shaped cross-sections of the spring coil.

The proposed device is utilized, in particular, as a braking device in a transmission, in particular in a vehicle transmission.

A pipe or a planar material (metal plate) can thus be provided as the starting material for the spring element. The manufacture of the spring element preferably takes places by using plastic deformation (i.e. deep-drawing, stamping, drawing, rolling, pressing, etc.) when a one-piece (one-part) solution for the spring element (i.e. spring windings together with axial end-sided connection portions) is provided. The desired and/or necessary additional functions can be provided in the previously-mentioned connection portions (affixing the spring by using an affixing flange and by using affixing means, i.e. bores for the screw fastening).

Furthermore, means for simply attaching and/or linking the affixing means can be provided, such as a bent flap having a bore for affixing the activator). The same also applies to additional designs for axially fixing the spring element to a free end (e.g., an inwardly-bent edge).

The spring windings can—as mentioned—be manufactured by a cutting separation as well as also by a thermal separation (e.g., plasma cutting, laser cutting, flame cutting) or by high pressure (e.g., water jet cutting).

An additional heat treatment process provides a high material strength and a wear protection. The heat treatment process is preferably performed prior to the manufacture of the spring windings.

The spring-windings cross-sections and/or the spring-winding spacings can be designed in a constant or also in a not constant manner.

Preferably, a gap between the spring-inner diameter and the to-be-braked and/or to-be-blocked shaft (cylinder-outer diameter) is in the range of 0.01 mm to 2.0 mm.

For the case of the multi-part structure of the spring element, a drawn pipe or a pipe segment is preferably used as the spring base body, wherein axially end-sided, friction-fit, interference-fit, or materially-bonded connecting elements (in particular affixing flanges) can be attached as separate parts. The connecting elements are thus formed as mentioned above, i.e. they are provided with appropriate bores in order to be able to fix them to a housing and/or to an actuating element. Here it can also be provided that an additional part for fixing the spring at its free end is provided on one axial end of the spring element, the inner diameter of which end is designed smaller than the inner diameter of the spring element.

The essential aspect in all cases is the manufacture of the spring element and/or its windings in the above-mentioned manner. For a cost-effective manufacture, it is also of importance how the starting part(s) for the spring element is (are) designed. The heat treatment and the method for introducing the incision for generating the helix are also important aspects, since they determine the suitability for series-manufacturing.

The gap width between the windings of the spring element preferably corresponds to the cutting width of the cutting process that is utilized and, generally speaking, is less than 5 mm.

BRIEF DESCRIPTION OF THE DRAWINGS

An exemplary embodiment of the invention is depicted in the drawings.

DETAILED DESCRIPTION OF THE INVENTION

Figure 1:
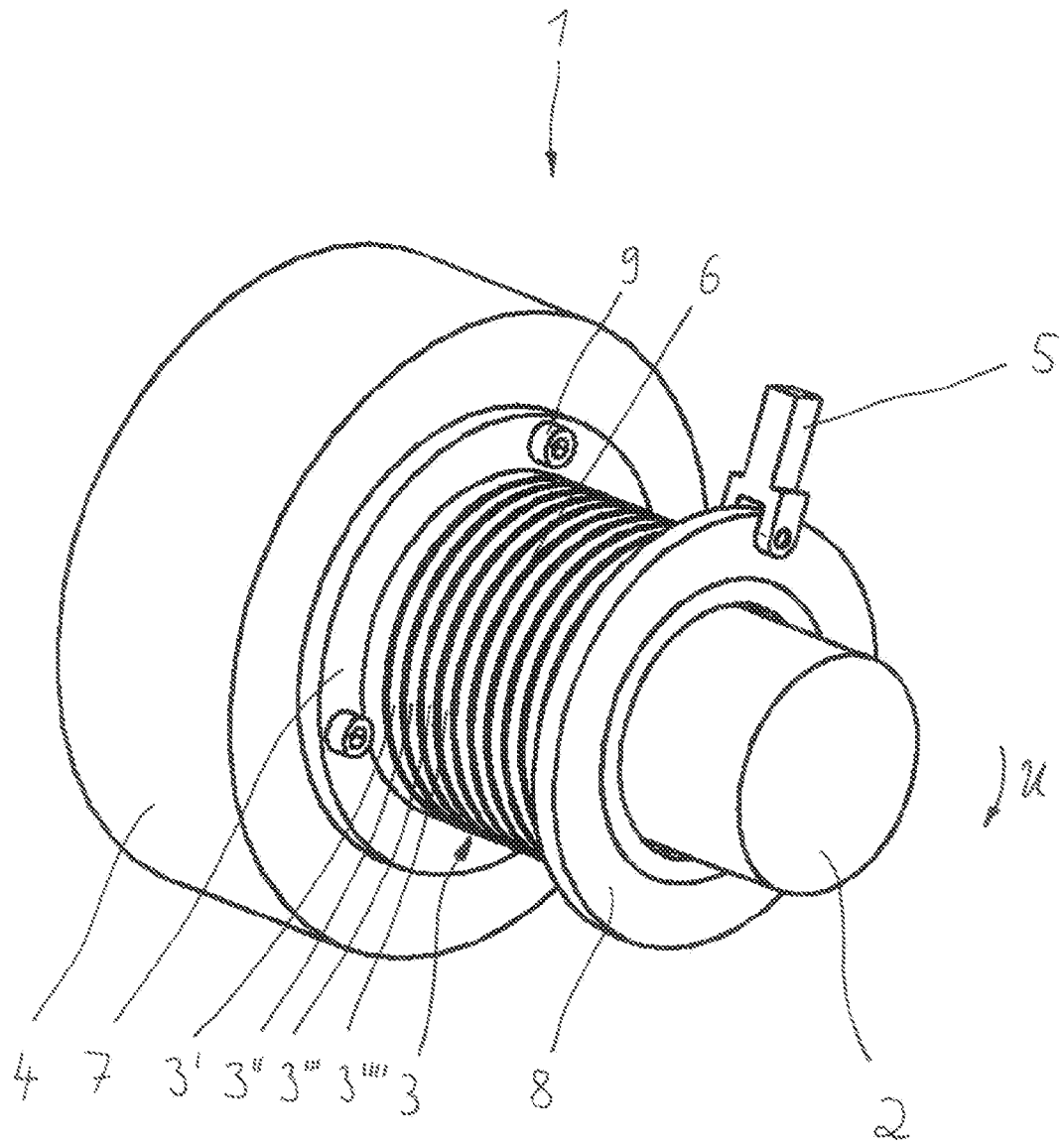
FIG. 1 shows in perspective illustration a device for braking and/or blocking a shaft.

A device 1 for braking and/or blocking a shaft 2 is depicted in the Figures; the shaft 2 represents a cylinder that is the output shaft of a transmission of a passenger vehicle. So that the vehicle does not roll back rearward on a hill prior to the traction by the internal combustion engine, the device 1 is provided, which applies a braking torque to the shaft 2.

So that this can take place, one axial end of a spring element 3 is affixed to the housing part 4, which corresponds to the transmission housing in the present case. The other axial end of the spring element 3 is connected with an actuating means 5 so that the actuating element 5 can displace the spring end in the circumferential direction U. During this movement, the spring element 3 tightens around the shaft 2 or its outer circumference so that the radial-inner surface of the spring element 3 frictionally contacts the outer circumferential surface of the shaft 2 and thus brakes the shaft 2, since the spring element 3 is fixed as a consequence of the attachment to the housing part 4 as such.

As can be seen, the two axial ends of the spring element 3 are each affixed and/or retained by affixing means 7 and 8. The affixing means 7 is formed as a flange-shaped ring, which is connected with the axial end of the spring element 3, e.g., in a materially-bonded manner by welding. The affixing element 7 is itself fixed to the housing 4 using screws 9.

Figure 3:
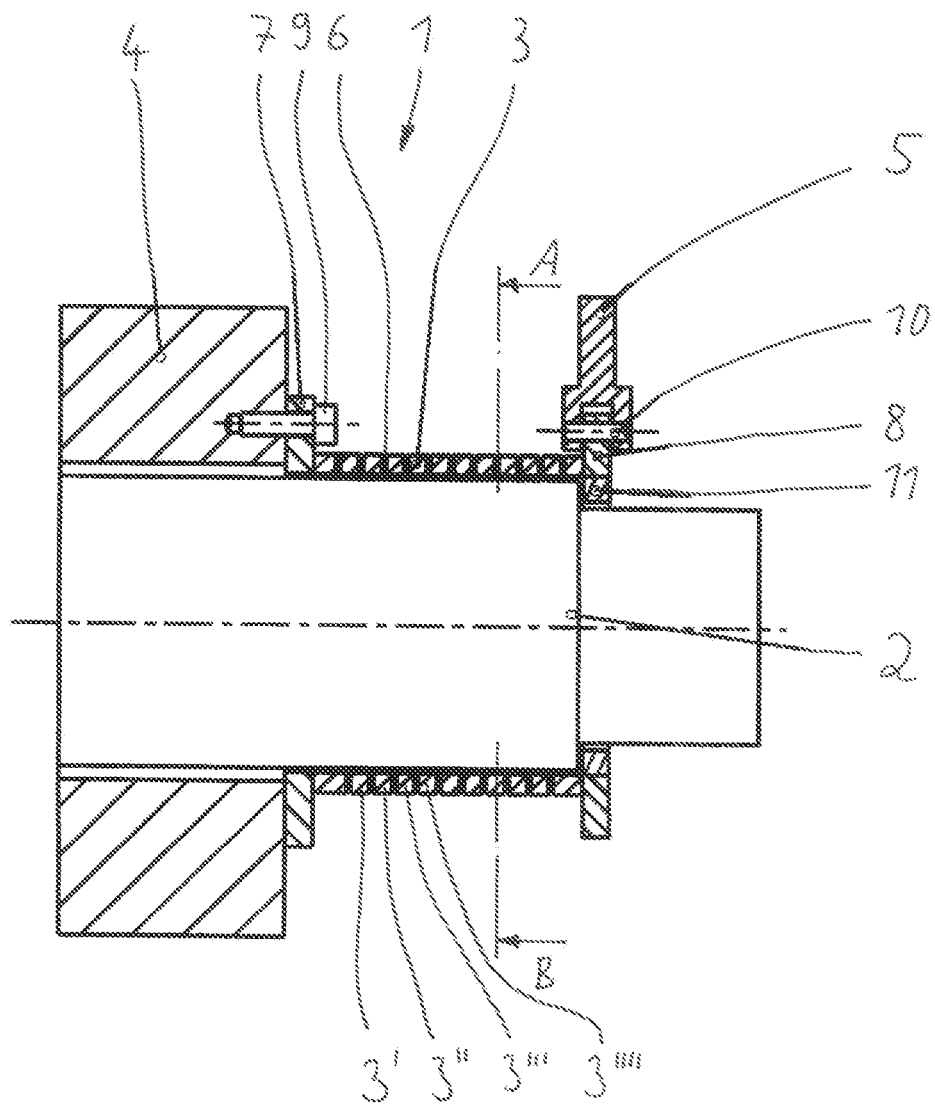
FIG. 3 shows the device according to FIG. 1 in a cross-section C-D according to FIG. 2.

On the other side, the spring element is connected with the affixing element 8 on an axial end side; the affixing element 8 is also formed in a ring-shaped manner in the present case. The actuating means 5 engages the affixing element 8 at one circumferential location and can twist the affixing element 8, and thus one axial end of the spring element 3, in the circumferential direction U in order to perform said cinching and clamping of the shaft 2. The actuating means 5 is linked to the affixing element 8 in a hinged manner via a pivot pin 11. The affixing element 8 also includes—as can be seen in FIG. 3, a radially-inward-projecting segment that forms an axial stop 11 for a step of the shaft 2.

The spring element 3 has a number of spring windings, which is illustrated in an exemplary manner by the reference numbers 3', 3'', 3''', 3''''. The spring windings result from introducing an incision 6 into a hollow-cylindrical spring base body, which incision 6 extends in a helical-shape and thereby creates the individual spring windings.

Figure 2:
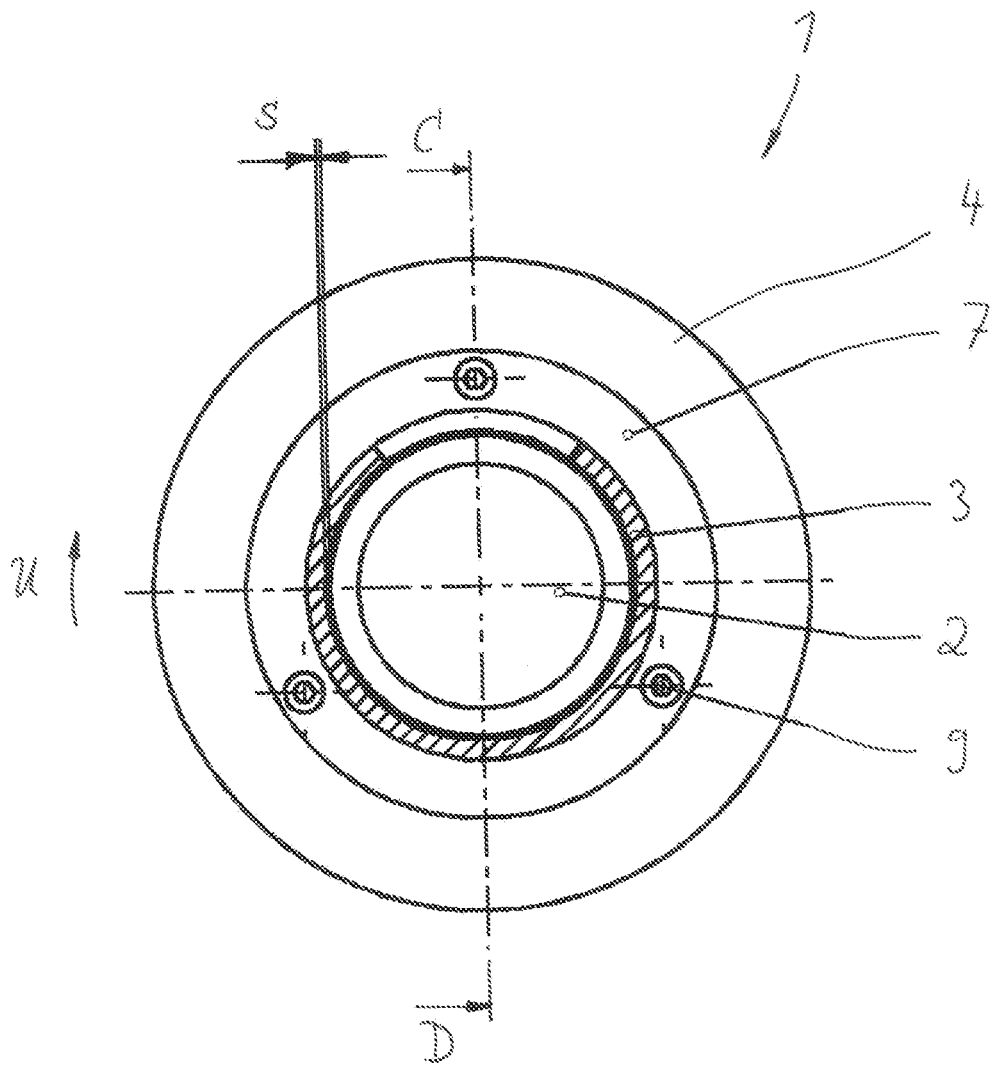
FIG. 2 shows the device according to FIG. 1 in a cross-section A-B according to FIG. 3

If the spring element 3 is not tensioned and the shaft 2 can thereby rotate in a friction-free manner, a gap S is present between the radially-inward-lying surface of the spring element 3 and the outer cylindrical surface of the shaft 2, as is pictured in FIG. 2.

If the shaft 2 should now be braked and/or blocked relative to the housing 4, the actuating means 5 actuates the affixing element 8 and twists it in the circumferential direction U. The spring element 3 thereby contacts the outer circumference of the shaft 2, i.e. the gap S becomes zero and the shaft 2 is clamped.

REFERENCE NUMBER LIST

1 Device for braking and/or blocking a shaft
2 Shaft (cylinder)
3 Spring element
3' Spring winding
3'' Spring winding
3''' Spring winding
3'''' Spring winding
4 Housing part
5 Actuating means
6 Incision
7 Affixing element
8 Affixing element
9 Screw
10 Pivot pin
11 Stop
U Circumferential direction
S gap

The invention claimed is:

1. A vehicle transmission comprising:
a housing part,
a shaft extending from the housing part and having an outer circumference,
a spring element having a plurality of spring windings wound around at least one portion of the outer circumference of the shaft, a first end of the spring element being fixed to the housing part, and
an actuating means attached to a second end of the spring element and configured to twist the second end in a circumferential direction of the spring element to thereby tighten the spring element and cause the spring element to frictionally contact the at least one portion of the outer circumference of the shaft,
wherein the spring element is comprised of a hollow cylindrical metal base body having a helical-shaped incision that defines the plurality of spring windings, the incision extending over a predetermined axial length of the base body,
the spring element has a wear protection coating on at least its radially-inward-facing surface,
the actuating means comprises an actuator arm, and
the second end of the spring element is affixed to the affixing disk and the actuator arm is affixed to the affixing disk.

2. The vehicle transmission according to claim 1, further comprising a flange-shaped affixing element disposed on at least one axial end portion of the hollow cylindrical base body.

3. The vehicle transmission according to claim 2, wherein the affixing element is made as a separate component and is attached to the base body.

4. The vehicle transmission according to claim 3, wherein the affixing element is connected to the base body by a friction-fit connection, an interference-fit connection or a materially-bonded connection.

5. The vehicle transmission according to claim 4, wherein the affixing element has a radially-outward-extending segment only at one circumferential location, and
the actuating means directly or indirectly engages the radially-outward-extending segment.

6. The vehicle transmission according to claim 4, wherein the affixing element has a circular-ring shape and a plurality of affixing bores are defined in the affixing element.

7. The vehicle transmission according to claim 1, wherein the spring element has at least 3 complete spring windings.

8. The vehicle transmission according to claim 1, wherein the actuator arm is hingedly connected to the affixing disk.

9. A vehicle transmission comprising:
a housing part,
a shaft extending from the housing part and having an outer circumference,
a spring element having a plurality of spring windings wound around at least one portion of the outer circumference of the shaft, a first end of the spring element being fixed to the housing part, and
an actuating means attached to a second end of the spring element and configured to twist the second end in a circumferential direction of the spring element to thereby tighten the spring element and cause the spring element to frictionally contact the at least one portion of the outer circumference of the shaft,
wherein the spring element is comprised of a hollow cylindrical metal base body having a helical-shaped incision that defines the plurality of spring windings, the incision extending over a predetermined axial length of the base body,
the spring element has a wear protection coating on at least its radially-inward-facing surface, and
further comprising a flange-shaped affixing element disposed on at least one axial end portion of the hollow cylindrical base body,
wherein the affixing element is comprised of the same material as the base body and is integral thereto with no seam therebetween, and
the flange-shaped affixing element comprises a flange at the first end of the base body and connects the first end of the spring element to the housing and wherein the actuating means comprises an affixing disk attached to the second end of the spring element and an actuator arm hingedly connected to the affixing disk.

10. A vehicle transmission comprising:
a housing part,
a shaft extending from the housing part and having an outer circumference,
a spring element having a plurality of spring windings wound around at least one portion of the outer circumference of the shaft, a first end of the spring element being fixed to the housing part, and
an actuator arm attached to a second end of the spring element and configured to twist the second end of the spring element in a circumferential direction about the shaft and cause the spring element to frictionally contact the at least one portion of the outer circumference of the shaft, wherein the spring element comprises a hollow cylindrical metal base body having a helical-shaped incision that defines the plurality of spring windings, the incision extending over a predetermined axial length of the base body, and the spring element has a wear protection coating on at least its radially-inward-facing surface, and including an affixing disk, wherein the second end of the spring element is affixed to the affixing disk and the actuator arm is affixed to the affixing disk, and wherein the actuator arm is hingedly connected to the affixing disk.

11. The vehicle transmission according to claim 10, further comprising an affixing flange disposed at the first end of the spring element and connecting the spring element to the housing, wherein the affixing flange is comprised of the same material as the base body and is integral thereto with no seam therebetween.

* * * * *